United States Patent
May et al.

(10) Patent No.: US 9,505,447 B2
(45) Date of Patent: Nov. 29, 2016

(54) GAP JOINT FOR CLOSED SECTION LOAD TRANSFER

(71) Applicant: Ford Global Technologies, LLC, Dearborn, MI (US)

(72) Inventors: Christopher John May, Novi, MI (US); Duncan Whipps, Grosse Pointe Farms, MI (US); Darrin Neil Wagner, Bloomfield Hills, MI (US); Fubang Wu, Woodhaven, MI (US); John Joyce, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 14/317,123

(22) Filed: Jun. 27, 2014

(65) Prior Publication Data

US 2015/0375794 A1    Dec. 31, 2015

(51) Int. Cl.
| | |
|---|---|
| B62D 27/02 | (2006.01) |
| B62D 25/06 | (2006.01) |
| B62D 29/00 | (2006.01) |
| B62D 25/02 | (2006.01) |
| B62D 25/04 | (2006.01) |
| B21C 37/15 | (2006.01) |
| B21D 26/021 | (2011.01) |

(52) U.S. Cl.
CPC .............. B62D 27/023 (2013.01); B62D 25/02 (2013.01); B62D 25/04 (2013.01); B62D 25/06 (2013.01); B62D 29/008 (2013.01); *B21C 37/15* (2013.01); *B21D 26/021* (2013.01)

(58) Field of Classification Search
CPC .. B62D 27/023; B62D 25/06; B62D 29/008; B21C 37/15; B21D 26/021
USPC ............... 296/187.12, 187.05, 205, 203.01, 296/203.03, 29, 30, 96.21, 210
See application file for complete search history.

(56) References Cited

U.S. PATENT DOCUMENTS

| | | | | |
|---|---|---|---|---|
| 5,269,585 A | * | 12/1993 | Klages ................ | B62D 29/008 296/201 |
| 5,795,014 A | | 8/1998 | Balgaard | |
| 7,290,831 B2 | | 11/2007 | Poss et al. | |
| 7,407,222 B2 | | 8/2008 | Anderson et al. | |
| 8,444,211 B2 | * | 5/2013 | Fujita .................. | B62D 21/152 296/187.05 |
| 2008/0136214 A1 | * | 6/2008 | Harrison, III ......... | B62D 65/06 296/107.17 |
| 2009/0108634 A1 | * | 4/2009 | Reed ..................... | B62D 25/04 296/210 |
| 2010/0244497 A1 | | 9/2010 | Honda et al. | |
| 2013/0193716 A1 | | 8/2013 | Kurokawa | |

FOREIGN PATENT DOCUMENTS

| | | |
|---|---|---|
| CN | 202686474 | 9/2012 |
| DE | 102011119560 | 5/2013 |

* cited by examiner

*Primary Examiner* — Joseph D Pape
*Assistant Examiner* — Dana Ivey
(74) *Attorney, Agent, or Firm* — Jason C. Rogers; Brooks Kushman P.C.

(57) ABSTRACT

A hydro-formed body side rail is assembled by a bracket to a front header. The front header is an extruded cross-car structural support that is joined to the body side rail by a framed joint. A gap is defined between the body side outer panel and the hydro-formed side rail relative to a lateral end of a front header. Side impact test loads are applied initially to the body side rail and compress the bracket. Compression of the bracket closes the gap and the impact loads are applied to the cross-car structural support.

16 Claims, 2 Drawing Sheets

GAP JOINT FOR CLOSED SECTION LOAD TRANSFER

TECHNICAL FIELD

This disclosure relates to vehicle body structures and, in particular, joints between body side rails and cross-car roof headers.

BACKGROUND

Vehicles are tested for crash-worthiness in side load impact tests. Vehicles fabricated as stamped steel assemblies require multiple stamped panels that are assembled with overlapping flanges that may be doubled-up to meet side impact test requirements. Multiple part assemblies require one-sided access and large weld access holes. These types of steel assemblies are relatively heavy structures compared to hydro-formed aluminum rails and extruded aluminum components.

In low volume production environments, hydro-formed members and extruded components can be manually fitted by machining, mitering and MIG welding the parts together to provide an acceptable fit. However, in high volume production variations in parts and tolerance stack-ups can complicate assembly operations for framed joints that involve joining hydro-formed members and extruded components. Oversized components may encounter interference when assembled together and undersized or misaligned components may not consistently meet side load impact tests.

The use of multiple piece aluminum stampings at framed joints requires thicker stampings or multiple layers of parts. Stamped parts are more difficult to join and assemble requiring additional assembly operations.

This disclosure is directed to solving the above problems and other problems as summarized below.

SUMMARY

Framed joints on vehicles between hydro-formed parts and extruded parts are disclosed that provide gaps that facilitate assembly operations and also provided consistent test results in side impact tests. Side impacts loads applied to extrusions and hydro-formed parts are more efficient (per unit mass) in handling loads than stamped structures.

According to one aspect of this disclosure, a framed joint is disclosed for a vehicle that includes a hydro-formed rail, a bracket and an extruded cross-car support. The bracket is secured to an inner surface of the rail and extending inwardly from the rail. The extruded cross-car structural support is assembled to the bracket in a spaced relationship relative to the rail to define a gap between the rail and the support that is arranged in vertical alignment with the rail.

According to other aspects of this disclosure, the framed joint may further comprise a body side outer panel attached to an outer surface of the rail that extends above the rail toward the support and that is spaced from the support. An outer surface of the hydro-formed rail includes an outwardly facing portion, an inwardly facing portion and an upwardly facing portion that over hangs the inwardly facing portion. The inwardly facing portion may be oriented with an upper corner of the inwardly facing portion being inboard of the lower area of the inwardly facing portion to facilitate capturing the support between the bracket and the rail in a side impact test.

According to another aspect of this disclosure, a structural joint for a vehicle body is disclosed that includes a hydro-formed body side rail, a bracket and an extruded cross-car windshield header. The bracket is secured to an inner surface of the body side rail and extends inwardly from the body side rail. The extruded cross-car windshield header is assembled to the bracket in a spaced relationship relative to the body side rail to define a gap between the rail and the header that is arranged in vertical alignment with the body side rail.

According to other aspects of this disclosure as it relates to a hydro-formed side rail and windshield header, the body side rail may be tubular and may include an inner/upper corner that protrudes inwardly relative to the vehicle to a greater extent than other parts of the body side rail. The windshield header may be a closed section extruded part that includes an upper wall and a lower wall that are spaced apart. The lower wall may be secured to the bracket and access holes may be provided in the upper wall to provide access for inserting fasteners to secure the lower wall to the bracket. A body side outer panel may extend about an outer side and upper side of the body side rail, and an inner edge of the body side outer panel may be spaced from an upper wall of the windshield header.

The loads applied in a side impact to the body side rail are transferred initially to the bracket and are then transferred after the gap is closed to the header. The body side rail may lock a bottom wall of the windshield header against the bracket in a side impact collision test.

According to another aspect of this disclosure, a method is disclosed for assembling a header to a body side rail for a vehicle. The method includes the steps of assembling a bracket to the body side rail. Assembling a body side outer panel outboard of an outer side of the body side rail and extending over the body side rail. The header is assembled onto the bracket in a spaced relationship relative to the body side rail and the body side outer panel to define a gap between the header and the body side rail that is bridged by the bracket.

According to other aspects of the disclosed method, the method may also include the step of hydro-forming the body side rail to form a closed section tube. The method may further comprise the step of extruding the windshield header to form a closed section extruded part. The step of extruding the header may also include extruding the closed section extruded part to include a lower wall and an upper wall that is spaced from the lower wall to partially define the closed section extruded part. The lower wall is spaced from the body side rail and the upper wall is spaced from a body side outer panel.

The method may further include the step of assembling the windshield header to the bracket in a vertical direction from above the body side rail.

The above aspects of this disclosure and other aspects will be described in greater detail below with reference to the drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
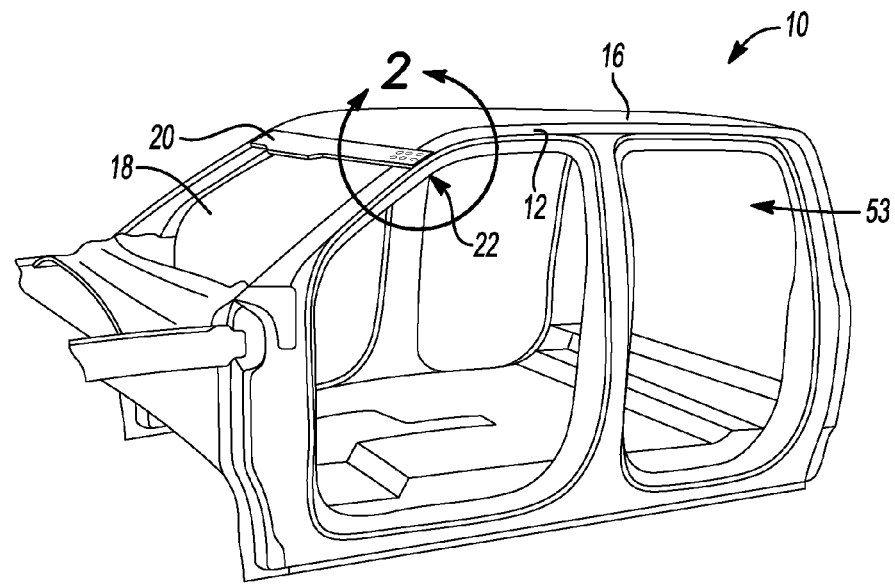
FIG. 1 is a fragmentary perspective view of a body-in-white (BIW) vehicle.

Referring to FIG. 1, a vehicle 10 is shown in part including a body side assembly 12. The body side assembly 12 includes a roof rail and an A pillar portion that form a combined structure that is formed in a hydro-forming operation. The roof rail portion of the body side assembly 12 supports a roof 16 of the vehicle 10. A windshield opening 18 is defined on its upper edge by a front header 20. The front header 20 in the illustrated embodiment is an extruded closed section member. The front header 20 may also be referred to as an extruded cross-car structural support. However, it should be understood that this disclosure is also potentially applicable to extruded cross-car structural supports that are located between the B pillars, C pillars or D pillars of a vehicle, and the like. A framed joint 22 is formed by assembling the front header 20 to the body side assembly 12 and will be described in greater detail below.

Figure 2:
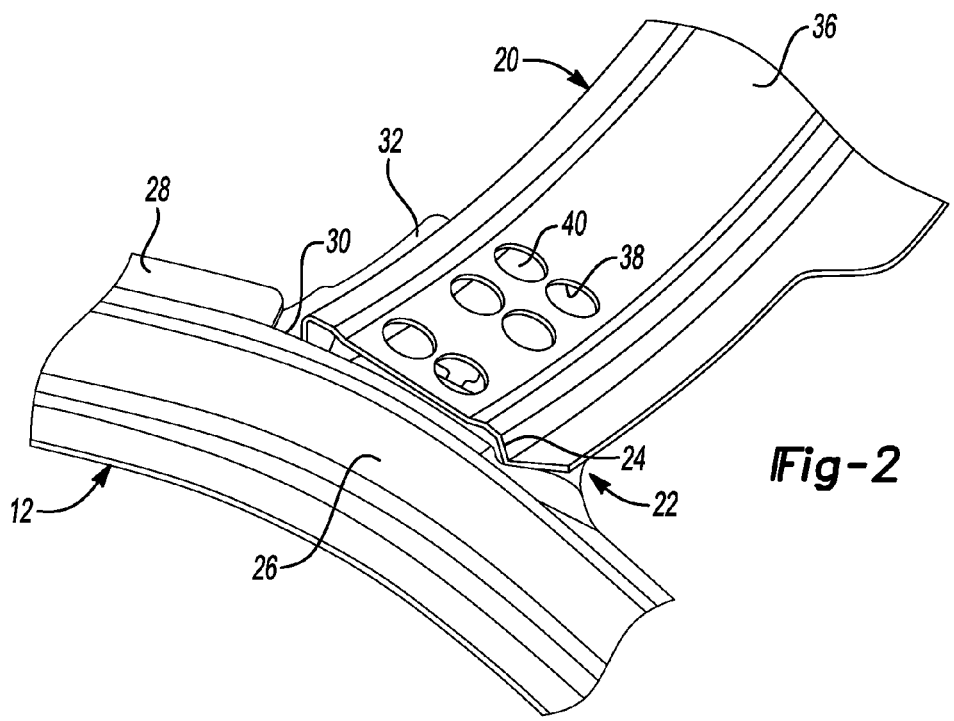
FIG. 2 is an enlarged fragmentary view of the portion of FIG. 1 shown in the circle 2.
Figure 3:
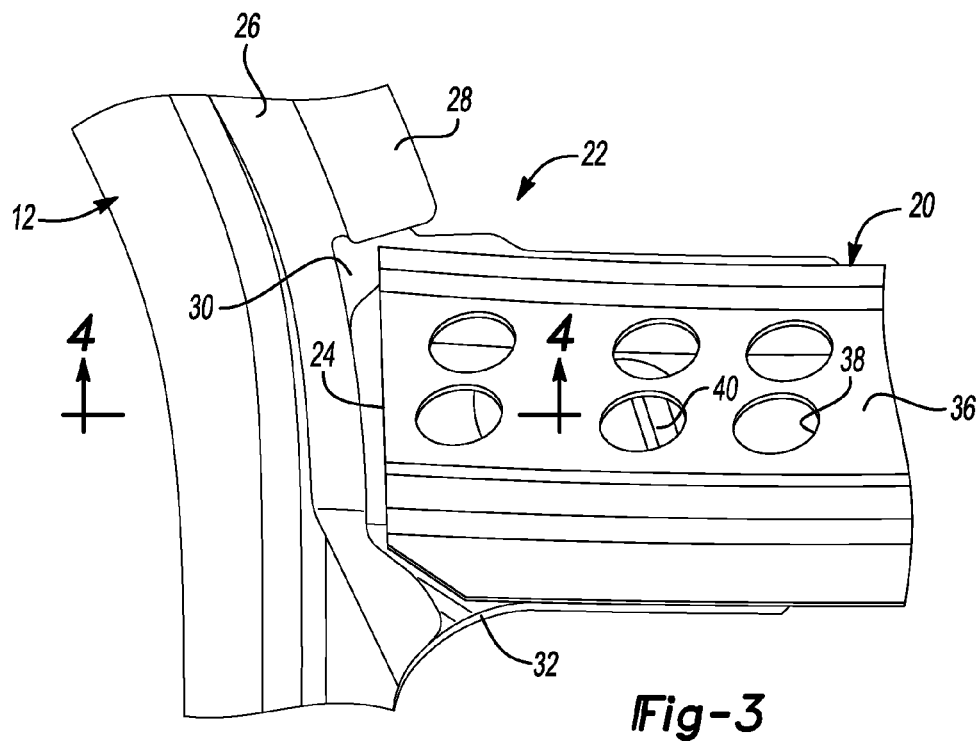
FIG. 3 is a fragmentary top perspective view of a framed joint formed between a hydro-formed body side rail and a cross-car support.

Referring to FIGS. 2 and 3, a lateral end 24 of the front header 20 as illustrated is the right side of the front header 20. The lateral end 24 is vertically aligned with the body side assembly 12. A body side outer panel 26 is attached to an outer side of the body side assembly 12. The body side outer panel 26 includes an inner flange 28 that extends from the body side assembly 12 toward the front header 20. The inner flange 28 defines a notch 30 that provides clearance for assembly of the front header 20 to a bracket 32. The bracket 32 is attached to the body side assembly 12 and supports the front header 20.

The front header 20 includes an upper wall 36 that defines a plurality of access holes 38. The front header 20 also includes a lower wall 40 that is spaced from the upper wall 36. The upper wall 36 and lower wall 40 form part of the extruded closed section comprising the front header 20. The access holes 38 provide access for one-sided fasteners to be inserted into the lower wall 40 to connect the lower wall 40 to the bracket 32.

Figure 4:
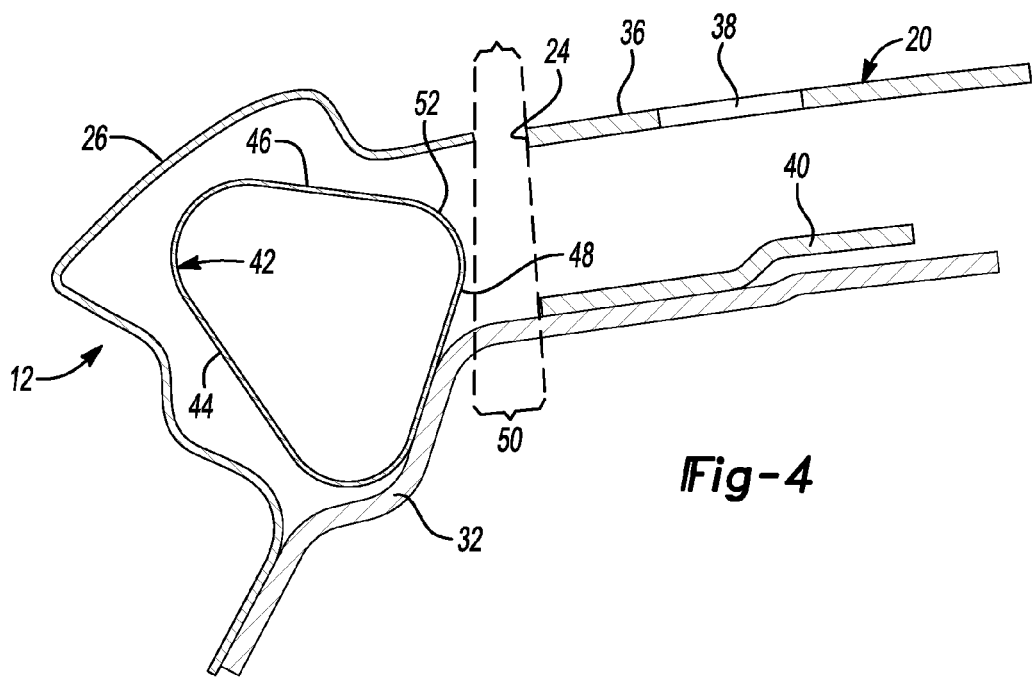
FIG. 4 is a cross-sectional view taken along the line 4-4 in FIG. 3.

Referring to FIG. 4, the body side assembly 12 is shown to include a hydro-formed body side rail 42. The body side rail 42 includes an outwardly facing portion 44, an upwardly facing portion 46 and an inwardly facing portion 48. The inwardly facing portion 48 may also be referred to as an inner surface of the hydro-formed body side rail 42.

A gap 50 is shown by dotted lines in FIG. 4. The gap 50 is defined between the hydro-formed body side rail 42 and the front header 20. The bracket 32 bridges the gap 50. The gap 50 may include a upper clearance (or air gap) defined between the notch 30 and a lateral end 24, and a lower clearance (or air gap) defined between the rail 42 and a lateral end of the lower wall 40. The gap 50 between the lower wall 40 and the front header 20 provides clearance for assembly of the front header 20, or extruded cross-car support, to be assembled onto the bracket 32 with clearance between the front header 20 and the hydro-formed body side rail 42. The gap 50 also separates the upper wall 36 of the extruded cross-car structural support 20 and the body side outer panel 26 and also provides clearance for assembly of the extruded cross-car structural support 20 onto the bracket 32.

In the event of a collision, or a side impact test, an impact is initially applied to the body side assembly 12. The hydro-formed body side rail 42 initially absorbs the impact and is displaced in the inboard direction and toward the front header 20. The bracket 32 is compressed until the hydro-formed body side rail 42 contacts the front header 20. The front header 20 is an extruded cross-car structural support that receives the side impact load directly from the body side rail 42.

An upper corner 52 is provided between the upwardly facing portion 46 and the inwardly facing portion 48 of the body side rail 42. The upper corner 52 may protrude inwardly towards the passenger cabin 53 to a greater extent than all other parts of the rail 42. Thus, the corner 52 defines an inner most portion of the rail 42. The upper corner 52 of the hydro-formed body side rail 42 is driven into the space between the upper wall 36 and the lower wall 40. The upper corner 52 in certain side impact tests clamps the lower wall 40 against the bracket 32.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A framed joint for a vehicle comprising:
   a hydro-formed tubular rail;
   a bracket attached to the rail and extending inwardly therefrom;
   a body panel attached to the rail and including an inner flange defining a notch; and
   an extruded cross-car structural support including an upper wall and a lower wall spaced apart to define a closed section, wherein the lower wall is assembled to the bracket such that a lateral end of the upper wall is disposed within the notch and a first air gap is defined between the lateral end and the notch, and such that a second air gap is defined between a lateral end of the lower wall and the rail.

2. The framed joint of claim 1 wherein the body panel is attached to an outer surface of the rail and extends above the rail toward the support.

3. The framed joint of claim 1 wherein an outer surface of the hydro-formed rail includes an outwardly facing portion, an upwardly facing portion and a inwardly facing portion, wherein the upwardly facing portion overhangs the inwardly facing portion.

4. The framed joint of claim 3 wherein the inwardly facing portion is oriented with an upper corner of the inwardly facing portion being inboard of a lower area of the inwardly facing portion to facilitate capturing the support between the bracket and the rail.

5. A joint for a vehicle comprising:
   a hydro-formed tubular roof rail;
   a bracket attached to the rail and extending inwardly therefrom;
   a body panel attached to the rail and including an inner flange defining a notch; and an extruded cross-car windshield header attached to the bracket such that a lateral end of the header is disposed within the notch and an air gap is defined between the lateral end and the notch.

6. The joint of claim 5 wherein the tubular roof rail includes an inner/upper corner that protrudes inwardly toward a passenger cabin of the vehicle to a greater extent than all other parts of the tubular roof rail.

7. The joint of claim 5 wherein the windshield header is a closed section extruded part that includes an upper wall and a lower wall that are spaced apart, wherein the lower wall is secured to the bracket and access holes are provided in the upper wall to provide access for securing the lower wall to the bracket.

8. The joint of claim 5 wherein loads applied in a side impact to the rail are transferred initially to the bracket and are transferred after the gap is closed to the header.

9. The joint of claim 8 wherein the rail locks a bottom wall of the windshield header against the bracket.

10. A method of assembling a header to a tubular rail for a vehicle comprising:
   assembling a bracket to the tubular rail such that the bracket extends inwardly From the tubular rail;
   assembling a body side outer panel outboard of an outer side of the tubular rail and extending over the tubular rail; and
   assembling a body side outer panel outboard of an outer side of the tubular rail and extending over the tubular rail, wherein the panel includes an inner flange defining a notch; and
   assembling the header onto the bracket such that a lateral end of the header is disposed within the notch and an air gap is defined between the lateral end and the notch.

11. The method of claim 10 further comprising hydroforming a tubular rail.

12. The method of claim 10 further comprising the step of extruding the header to form a closed section extruded part.

13. The method of claim 12 wherein the closed section extruded part includes a lower wall and an upper wall that is spaced from the lower wall to partially define the closed section extruded part.

14. The method of claim 13 wherein the lower wall is spaced from the rail and the upper wall is spaced from the notch.

15. The method of claim 10 wherein the header is assembled in a vertical direction from above the body side rail and onto the bracket.

16. The method of claim 10 wherein the tubular rail is a tubular roof rail.

* * * * *